(12) United States Patent
Sato (10) Patent No.: US 12,467,459 B2
(45) Date of Patent: Nov. 11, 2025

(54) DIAGNOSIS METHOD, DIAGNOSIS APPARATUS, AND DIAGNOSIS SYSTEM

(71) Applicant: SEIKO EPSON CORPORATION, Tokyo (JP)

(72) Inventor: Kenta Sato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 298 days.

(21) Appl. No.: 18/189,523

(22) Filed: Mar. 24, 2023

(65) Prior Publication Data

US 2023/0304498 A1 Sep. 28, 2023

(30) Foreign Application Priority Data

Mar. 25, 2022 (JP) .................... 2022-049467

(51) Int. Cl.
*F04C 28/28* (2006.01)
*F04C 18/16* (2006.01)
*G01H 9/00* (2006.01)
*G01P 15/18* (2013.01)

(52) U.S. Cl.
CPC .............. *F04C 28/28* (2013.01); *F04C 18/16* (2013.01); *G01H 9/00* (2013.01); *G01P 15/18* (2013.01); *F04C 2270/80* (2013.01)

(58) Field of Classification Search
CPC ...... G01P 15/18; G01P 15/08; G01P 15/0802; F04C 18/16; G01H 9/00
See application file for complete search history.

(56) References Cited

U.S. PATENT DOCUMENTS

| | | | | |
|---|---|---|---|---|
| 2010/0292597 | A1* | 11/2010 | Watanabe | G16H 50/30 600/509 |
| 2011/0270579 | A1* | 11/2011 | Watson | G16H 40/40 702/189 |
| 2016/0302736 | A1* | 10/2016 | Koyama | A61B 5/6831 |
| 2018/0070863 | A1* | 3/2018 | Matsumura | G06T 11/00 |
| 2018/0220935 | A1* | 8/2018 | Tadano | A61B 5/11 |
| 2018/0242839 | A1* | 8/2018 | Fukuhara | A61B 3/102 |
| 2022/0075342 | A1* | 3/2022 | Szipka | G01P 15/0802 |
| 2022/0099633 | A1* | 3/2022 | Sato | G01M 5/0066 |
| 2023/0055678 | A1* | 2/2023 | Sato | H04B 17/309 |
| 2023/0389814 | A1* | 12/2023 | Fujita | A61B 5/7225 |
| 2024/0117791 | A1* | 4/2024 | Holtom | F03D 17/011 |

FOREIGN PATENT DOCUMENTS

JP 2000-258305 A 9/2000

* cited by examiner

*Primary Examiner* — Helen C Kwok
(74) *Attorney, Agent, or Firm* — Harness, Dickey & Pierce, P.L.C.

(57) ABSTRACT

A diagnosis method includes: a physical quantity detection step of detecting a physical quantity generated in a diagnosis target by using a physical quantity sensor; a Lissajous figure generation step of generating a three-dimensional Lissajous figure by plotting the physical quantity detected in the physical quantity detection step in a three-dimensional coordinate system including a first axis, a second axis, and a third axis; a vibration plane information acquisition step of acquiring information on a vibration plane of the vibration from the three-dimensional Lissajous figure generated in the Lissajous figure generation step; and a diagnosis step of diagnosing a state of the diagnosis target based on the information on the vibration plane acquired in the vibration plane information acquisition step.

9 Claims, 10 Drawing Sheets

DIAGNOSIS METHOD, DIAGNOSIS APPARATUS, AND DIAGNOSIS SYSTEM

The present application is based on, and claims priority from JP Application Serial Number 2022-049467, filed Mar. 25, 2022, the disclosure of which is hereby incorporated by reference herein in its entirety.

BACKGROUND

1. Technical Field

The present disclosure relates to a diagnosis method, a diagnosis apparatus, and a diagnosis system.

2. Related Art

An abnormality diagnosis apparatus disclosed in JP-A-2000-258305 includes: a vibration detection unit that respectively detects vibrations at a predetermined position on two axes to output vibration waveform signals; a Lissajous waveform diagram generation unit that generates a Lissajous waveform diagram based on the two vibration waveform signals output by the vibration detection unit; a reference Lissajous waveform diagram setting unit that presets and stores a plurality of reference Lissajous waveform diagrams assumed based on causes of abnormalities; and an abnormality cause determination unit that determines and outputs an abnormality cause by comparing the Lissajous waveform diagram generated by the Lissajous waveform diagram generation unit with the reference Lissajous waveform diagrams stored in the reference Lissajous waveform diagram setting unit.

However, in the abnormality diagnosis apparatus in JP-A-2000-258305, since the reference Lissajous waveform diagrams are prepared in advance in correspondence with an installation direction of a sensor for a target to which the apparatus is applied, diagnosis accuracy may deteriorate due to deviation of the installation direction.

SUMMARY

A diagnosis method of the present disclosure includes:
a physical quantity detection step of detecting a physical quantity generated in a diagnosis target by using a physical quantity sensor;
a Lissajous figure generation step of generating a three-dimensional Lissajous figure by plotting the physical quantity detected in the physical quantity detection step in a three-dimensional coordinate system including a first axis, a second axis, and a third axis;
a vibration plane information acquisition step of acquiring information on a vibration plane of the vibration from the three-dimensional Lissajous figure generated in the Lissajous figure generation step; and
a diagnosis step of diagnosing a state of the diagnosis target based on the information on the vibration plane acquired in the vibration plane information acquisition step.

A diagnosis apparatus of the present disclosure performs:
a physical quantity detection step of detecting a physical quantity generated in a diagnosis target by using a physical quantity sensor,
a Lissajous figure generation step of generating a three-dimensional Lissajous figure by plotting the physical quantity detected in the physical quantity detection step in a three-dimensional coordinate system including a first axis, a second axis, and a third axis,
a vibration plane information acquisition step of acquiring information on a vibration plane of the vibration from the three-dimensional Lissajous figure generated in the Lissajous figure generation step, and
a diagnosis step of diagnosing a state of the diagnosis target based on the information on the vibration plane acquired in the vibration plane information acquisition step.

A diagnosis system of the present disclosure includes:
a physical quantity sensor configured to detect a physical quantity generated in a diagnosis target; and
a diagnosis apparatus configured to diagnose a state of the diagnosis target based on a detection signal of the physical quantity sensor, in which
the diagnosis apparatus performs:
a physical quantity detection step of detecting the physical quantity generated in the diagnosis target by using the physical quantity sensor,
a Lissajous figure generation step of generating a three-dimensional Lissajous figure by plotting the physical quantity detected in the physical quantity detection step in a three-dimensional coordinate system including a first axis, a second axis, and a third axis,
a vibration plane information acquisition step of acquiring information on a vibration plane of the vibration from the three-dimensional Lissajous figure generated in the Lissajous figure generation step, and
a diagnosis step of diagnosing the state of the diagnosis target based on the information on the vibration plane acquired in the vibration plane information acquisition step.

DESCRIPTION OF EXEMPLARY EMBODIMENTS

Hereinafter, a diagnosis method, a diagnosis apparatus, and a diagnosis system according to the present disclosure will be described in detail based on preferred shown embodiments.

First Embodiment

Figure 1:
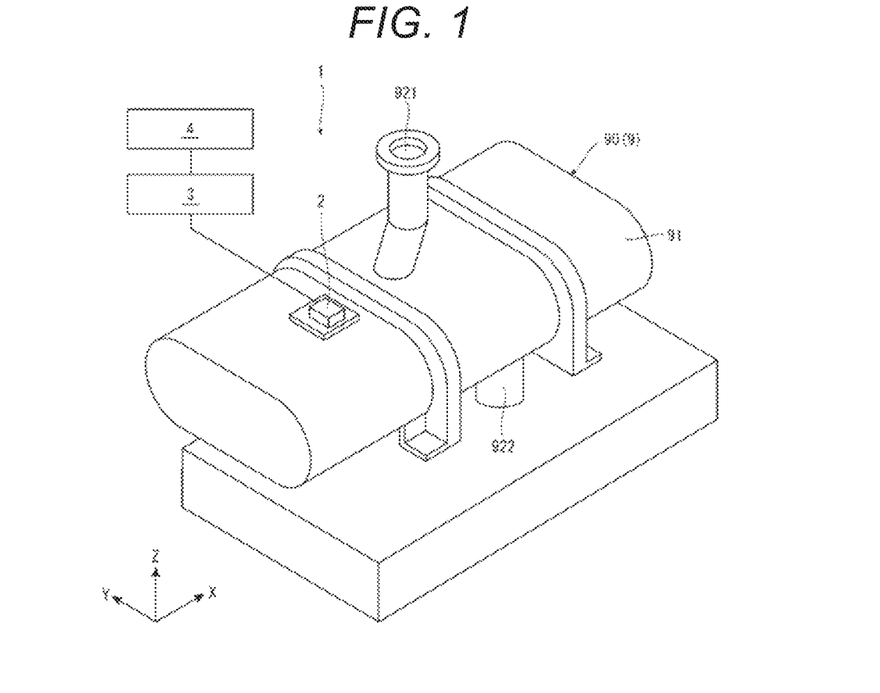
FIG. 1 is a diagram showing an overall configuration of a diagnosis system according to a first embodiment.
Figure 2:
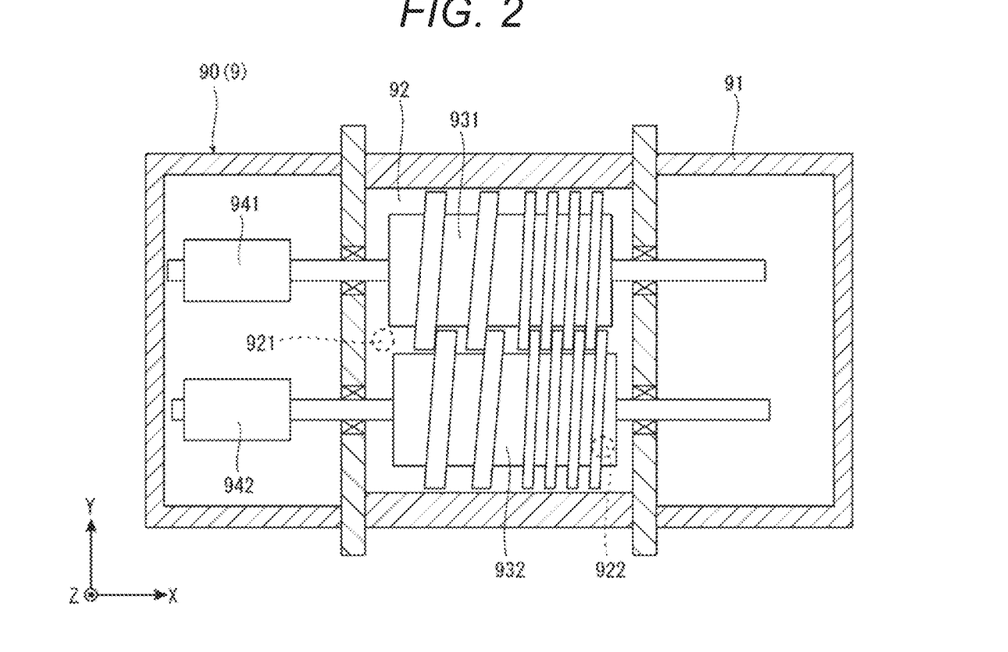
FIG. 2 is a cross-sectional view of a vacuum pump.
Figure 3:
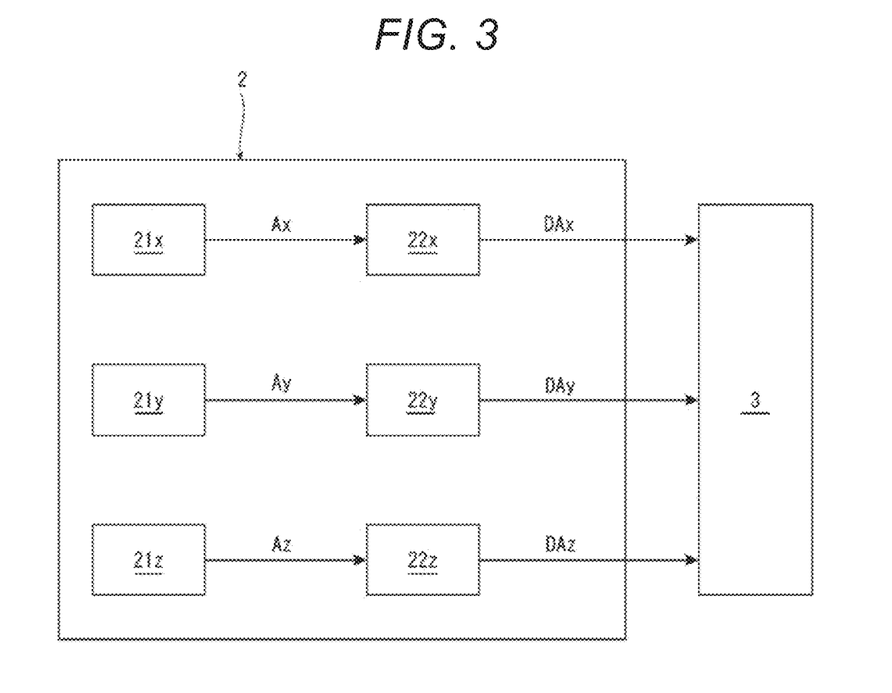
FIG. 3 is a block diagram of a sensor unit.
Figure 4:
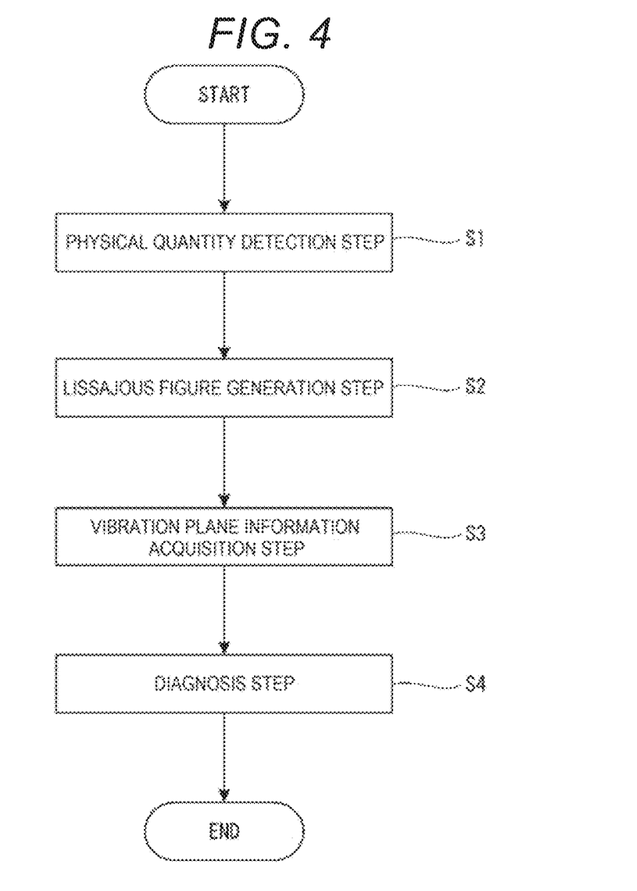
FIG. 4 is a flowchart showing a diagnosis step performed by the diagnosis system.
Figure 5:
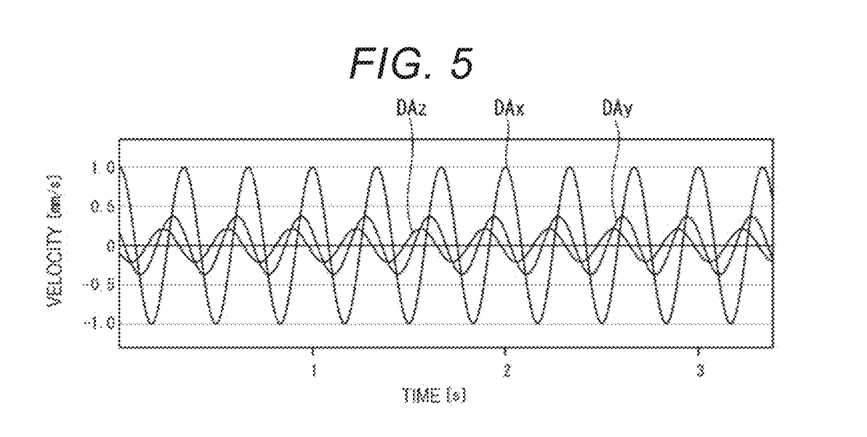
FIG. 5 is a diagram showing digital time-series signals.
Figure 6:
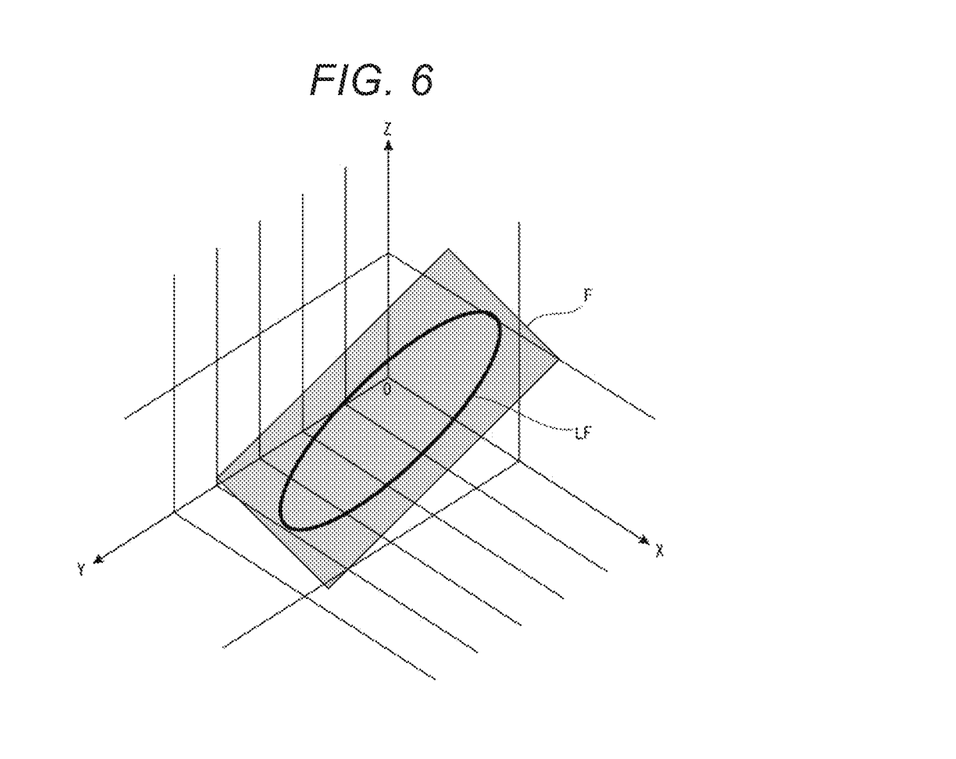
FIG. 6 is a diagram showing a three-dimensional Lissajous figure.
Figure 7:
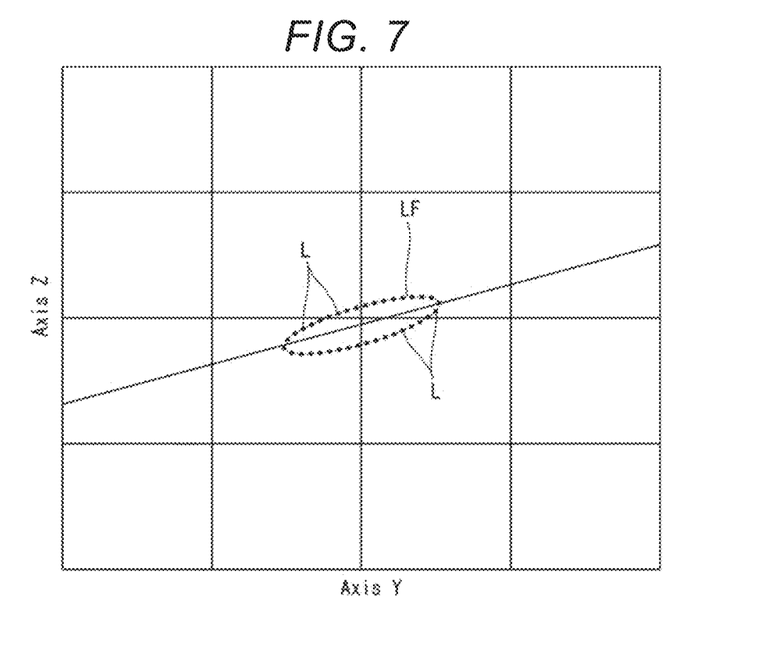
FIG. 7 is a diagram showing a two-dimensional Lissajous figure when viewed from an X-axis direction.
Figure 8:
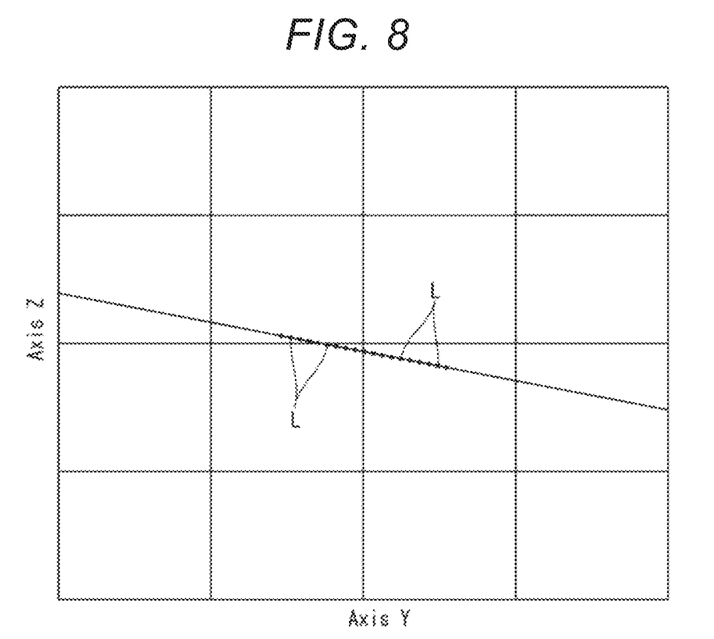
FIG. 8 is a diagram showing a two-dimensional Lissajous figure when viewed from an X'-axis direction.
Figure 9:
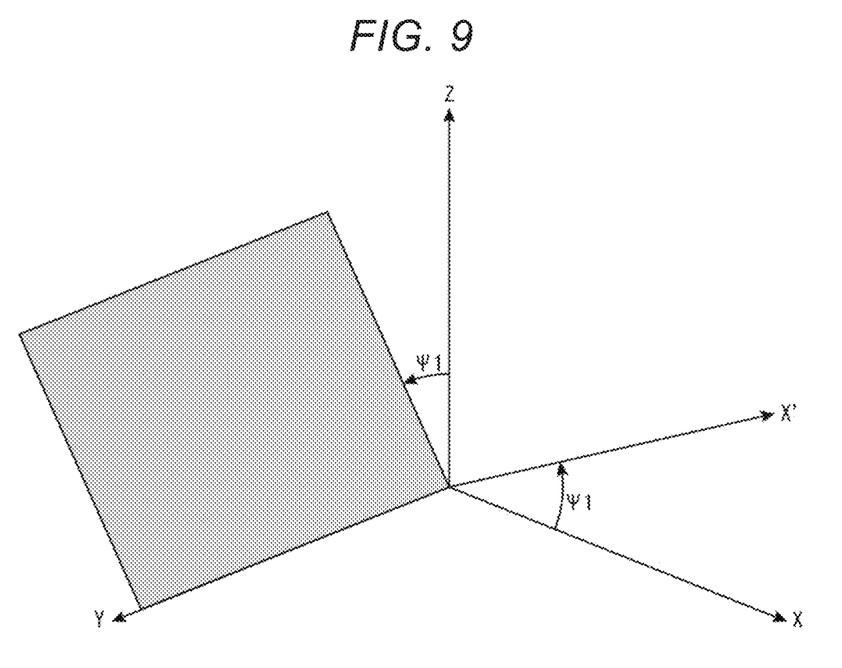
FIG. 9 is a diagram showing a rotation angle $\Psi 1$.
Figure 10:
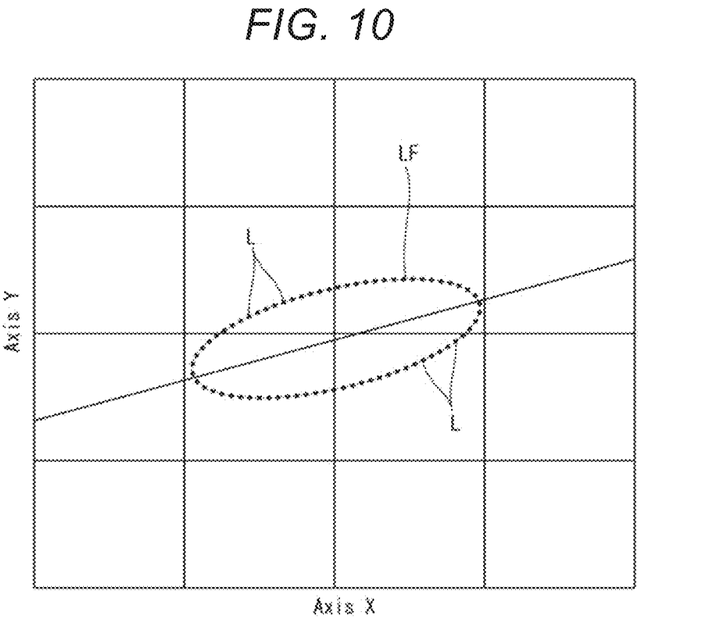
FIG. 10 is a diagram showing a two-dimensional Lissajous figure when viewed from a Z-axis direction.
Figure 11:
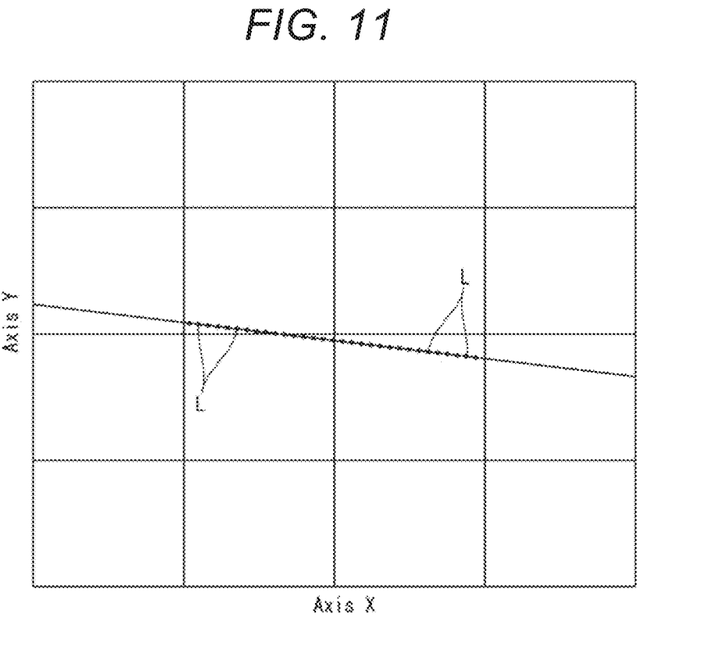
FIG. 11 is a diagram showing a two-dimensional Lissajous figure when viewed from a Z'-axis direction.
Figure 12:
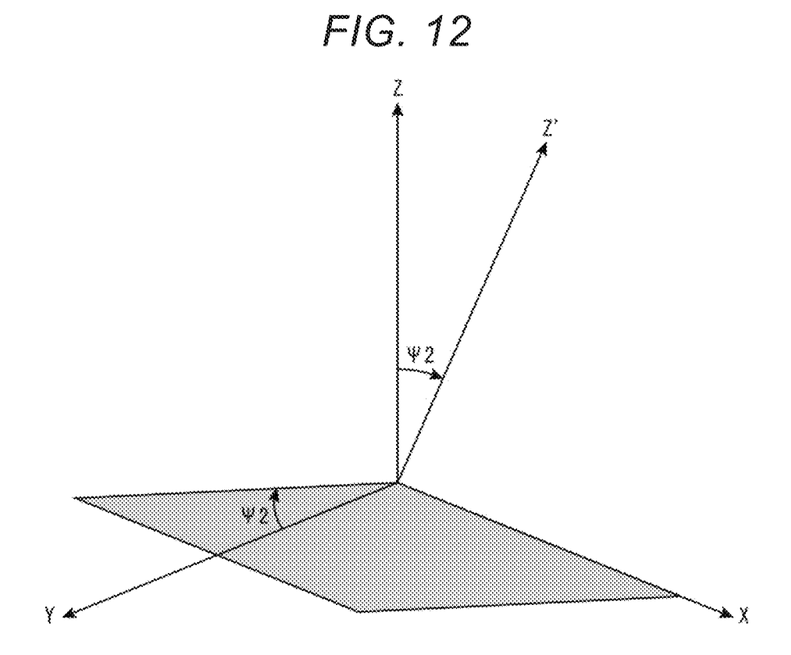
FIG. 12 is a diagram showing a rotation angle $\Psi 2$.
Figure 13:
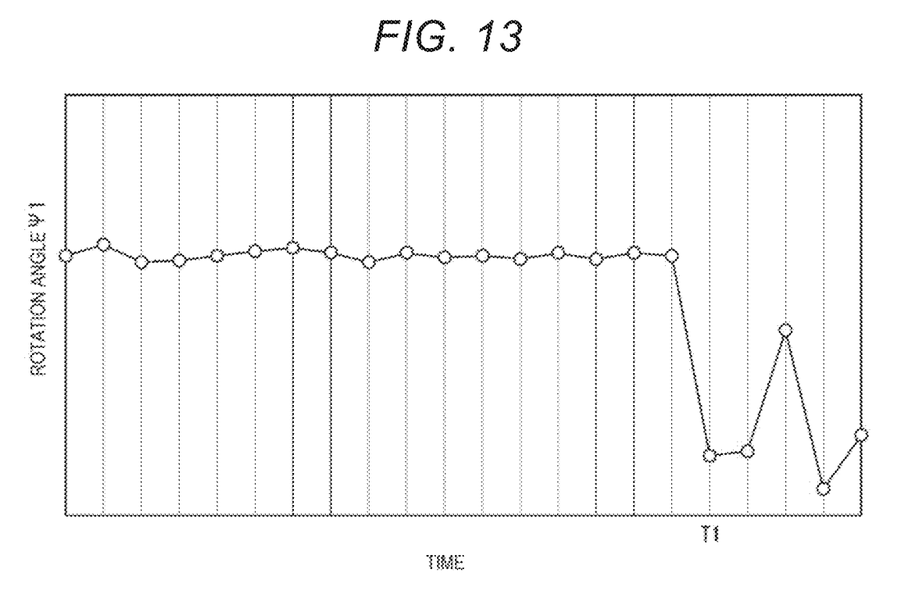
FIG. 13 is a graph showing a temporal change in the rotation angle $\Psi 1$.
Figure 14:
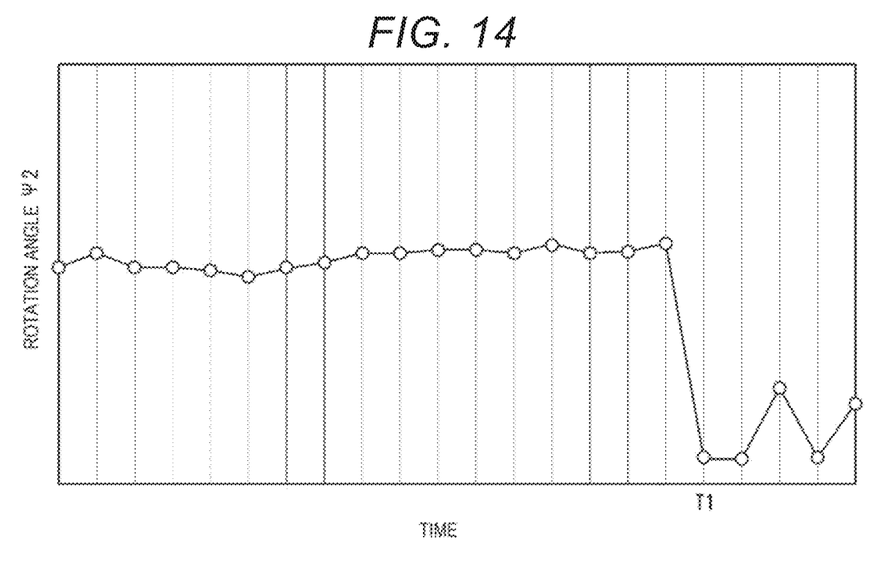
FIG. 14 is a graph showing a temporal change in the rotation angle $\Psi 2$.
Figure 15:
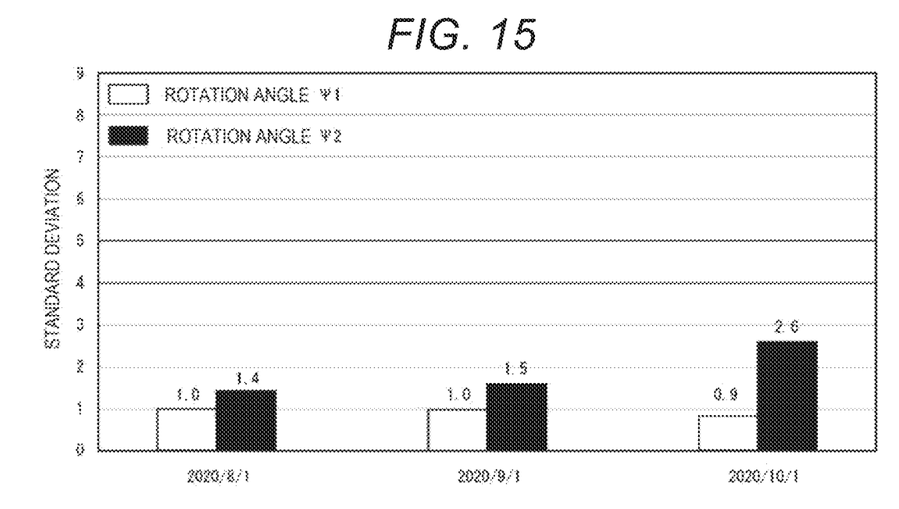
FIG. 15 is a graph showing temporal changes in standard deviations of the rotation angles $\Psi 1$ and $\Psi 2$.
Figure 16:
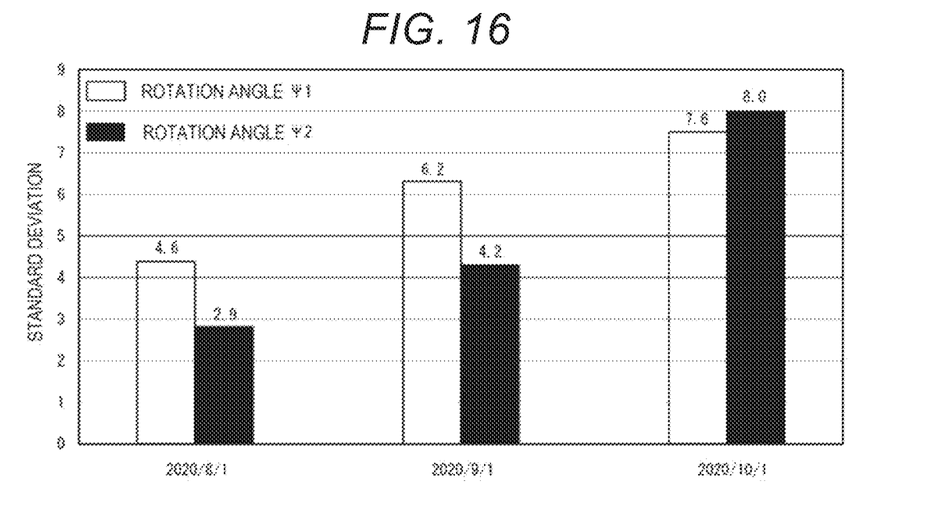
FIG. 16 is a graph showing temporal changes in standard deviations of the rotation angles $\Psi 1$ and $\Psi 2$.

FIG. 1 is a diagram showing an overall configuration of a diagnosis system according to a first embodiment. FIG. 2 is a cross-sectional view of a vacuum pump. FIG. 3 is a block diagram of a sensor unit. FIG. 4 is a flowchart showing a diagnosis step performed by the diagnosis system. FIG. 5 is a diagram showing digital time-series signals. FIG. 6 is a diagram showing a three-dimensional Lissajous figure. FIG. 7 is a diagram showing a two-dimensional Lissajous figure when viewed from an X-axis direction. FIG. 8 is a diagram showing a two-dimensional Lissajous figure when viewed from an X'-axis direction. FIG. 9 is a diagram showing a rotation angle Ψ1. FIG. 10 is a diagram showing a two-dimensional Lissajous figure when viewed from a Z-axis direction. FIG. 11 is a diagram showing a two-dimensional Lissajous figure when viewed from a Z'-axis direction. FIG. 12 is a diagram showing a rotation angle Ψ2. FIG. 13 is a graph showing a temporal change in the rotation angle Ψ1. FIG. 14 is a graph showing a temporal change in the rotation angle Ψ2. FIGS. 15 and 16 are graphs showing temporal changes in standard deviations of the rotation angles Ψ1 and Ψ2, respectively. For convenience of description, three axes orthogonal to one another are set as an X axis, a Y axis, and a Z axis.

A diagnosis system 1 shown in FIG. 1 is a system that diagnoses a state of a diagnosis target 9 by analyzing vibration of the diagnosis target 9, and includes a sensor unit 2 that detects the vibration of the diagnosis target 9, a diagnosis apparatus 3 that diagnoses the state of the diagnosis target 9 based on a detection signal of the sensor unit 2, and a display apparatus 4 for notifying a user of necessary information.

The diagnosis target 9 is not particularly limited, and may be, for example: various apparatuses including a rotation mechanism or a vibration mechanism, such as a motor; a structure that vibrates due to an external force, such as a bridge or a building; or an electric circuit that generates a signal having periodicity.

The diagnosis target 9 according to the present embodiment is a vacuum pump 90. As shown in FIGS. 1 and 2, the vacuum pump 90 includes a housing 91, a pump chamber 92 formed in the housing 91 and including an intake port 921 and an exhaust port 922, a pair of pump rotors 931 and 932 disposed in the pump chamber 92, and a pair of motors 941 and 942 that causes the pump rotors 931 and 932 to rotate around central axes thereof. The motors 941 and 942 cause the pump rotors 931 and 932 to rotate in directions opposite to each other, so that air is suctioned from the intake port 921 and discharged from the exhaust port 922. In the vacuum pump 90 having such a configuration, vibration is generated by the rotation of the pump rotors 931 and 932.

In the diagnosis system 1, the vibration of the vacuum pump 90 is detected, and the state of the vacuum pump 90 is diagnosed by analyzing the detected vibration. As shown in FIG. 1, the sensor unit 2 is attached to the housing 91 of the vacuum pump 90, and detects a physical quantity generated by the vibration of the vacuum pump 90. However, an attachment location of the sensor unit 2 is not particularly limited as long as the physical quantity generated by the vibration of the vacuum pump 90 can be detected. Further, the sensor unit 2 may be attached and detached each time a diagnosis is to be made, or may be installed normally.

The physical quantity generated by the vibration of the vacuum pump 90 is not particularly limited, and examples thereof include an acceleration, an angular velocity, a velocity, displacement, a pressure, a current, and a voltage. In the following description, a case where the physical quantity generated by the vibration of the vacuum pump 90 is the acceleration will be representatively described.

As shown in FIG. 3, the sensor unit 2 includes three acceleration sensors 21x, 21y, and 21z serving as physical quantity sensors, and three processing circuits 22x, 22y, and 22z that process signals from the acceleration sensors 21x, 21y, and 21z.

The acceleration sensor 21x detects an acceleration Ax in the X-axis direction, the acceleration sensor 21y detects an acceleration Ay in the Y-axis direction, and the acceleration sensor 21z detects an acceleration Az in the Z-axis direction. The three acceleration sensors 21x, 21y, and 21z are synchronized with one another, and periodically detect the accelerations Ax, Ay, and Az at the same timing.

The acceleration sensors 21x, 21y, and 21z may be, for example, sensors using micro electro mechanical systems (MEMS) vibrators, or sensors using crystal vibrators. Further, the acceleration sensors 21x, 21y, and 21z may be incorporated into one apparatus such as an inertial measurement unit (IMU), or at least one of the acceleration sensors 21x, 21y, and 21z may be physically separated from the other sensors.

The processing circuit 22x processes a detection signal from the acceleration sensor 21x to output a digital time-series signal DAx of the acceleration Ax, the processing circuit 22y processes a detection signal from the acceleration sensor 21y to output a digital time-series signal DAy of the acceleration Ay, and the processing circuit 22z processes a detection signal from the acceleration sensor 21z to output a digital time-series signal DAz of the acceleration Az.

The diagnosis apparatus 3 processes the three digital time-series signals DAx, DAy, and DAz output from the sensor unit 2 to diagnose the state of the vacuum pump 90. The diagnosis apparatus 3 is implemented with, for example, a computer, and includes a processor that processes information, a memory communicably connected to the processor, and an external interface coupled to an external apparatus. The memory stores various programs that can be executed by the processor, and the processor can read and execute the various programs and the like stored in the memory.

As shown in FIG. 4, the diagnosis system 1 performs a physical quantity detection step S1 of detecting the physical quantity generated by the vibration of the vacuum pump 90 by using the sensor unit 2, a Lissajous figure generation step S2 of generating a three-dimensional Lissajous figure LF based on a detection result in the physical quantity detection step S1, a vibration plane information acquisition step S3 of acquiring information on a vibration plane F of the vibration generated in the vacuum pump 90 from the three-dimensional Lissajous figure LF generated in the Lissajous figure generation step S2, and a diagnosis step S4 of diagnosing the state of the vacuum pump 90 based on the information on the vibration plane F acquired in the vibration plane information acquisition step S3.

Physical Quantity Detection Step S1

In the physical quantity detection step S1, as shown in FIG. 5, the diagnosis apparatus 3 acquires the three digital time-series signals DAx, DAy, and DAz output from the sensor unit 2.

Lissajous Figure Generation Step S2

In the Lissajous figure generation step S2, the diagnosis apparatus 3 generates the three-dimensional Lissajous figure LF in a three-dimensional orthogonal coordinate system including the X axis, the Y axis, and the Z axis as shown in FIG. 6, based on the digital time-series signals DAx, DAy, and DAz shown in FIG. 5 and acquired in the physical quantity detection step S1. That is, the diagnosis apparatus 3 generates the three-dimensional Lissajous figure LF in the three-dimensional orthogonal coordinate system by assigning the digital time-series signal DAx to the X axis, assigning the digital time-series signal DAy to the Y axis, and assigning the digital time-series signal DAz to the Z axis. In the present embodiment, the X axis is a first axis, the Y axis is a second axis, and the Z axis is a third axis.

Vibration Plane Information Acquisition Step S3

Here, as a result of intensive studies, the inventors have found that there are many cases where the three-dimensional Lissajous figure LF vibrates on a predetermined plane. Therefore, in the vibration plane information acquisition step S3, as shown in FIG. 6, the diagnosis apparatus 3 specifies the "predetermined plane" as the vibration plane F based on the three-dimensional Lissajous figure LF generated in the Lissajous figure generation step S2, and acquires information on the specified vibration plane F. A method for specifying the vibration plane F is not particularly limited, and examples thereof include the following method.

First, as shown in FIG. 7, the diagnosis apparatus 3 views the three-dimensional Lissajous figure LF from the X-axis direction in a plan view, projects plot points L of the three-dimensional Lissajous figure LF on a YZ plane with the X axis being a normal line, and linearly approximates the plot points L by a least-squares method. Hereinafter, the step is also referred to as a first linear approximation step. The diagnosis apparatus 3 performs the first linear approximation step a plurality of times while changing a direction in which the three-dimensional Lissajous figure LF is viewed in a plan view around the Y axis, and among these, specifies a result having a smallest error of linear approximation as shown in FIG. 8. Next, as shown in FIG. 9, the diagnosis apparatus 3 sets the plan view direction of the specified result as the X'-axis direction, and specifies the rotation angle $\Psi 1$ of an X' Z-axis with respect to the X axis around the Y axis.

Next, as shown in FIG. 10, the diagnosis apparatus 3 views the three-dimensional Lissajous figure LF from the Z-axis direction in a plan view, projects the plot points L of the three-dimensional Lissajous figure LF on an XY plane with the Z axis being a normal line, and linearly approximates the plot points L by the least-squares method. Hereinafter, the step is also referred to as a second linear approximation step. The diagnosis apparatus 3 performs the second linear approximation step a plurality of times while changing the direction in which the three-dimensional Lissajous figure LF is viewed in a plan view around the X axis, and among these, specifies a result having a smallest error of the linear approximation as shown in FIG. 11. Next, as shown in FIG. 12, the diagnosis apparatus 3 sets a plan view direction of the specified result as the Z'-axis direction, and specifies the rotation angle $\Psi 2$ of a Z' axis with respect to the Z axis around the X axis.

Next, the diagnosis apparatus 3 specifies the vibration plane F based on the specified rotation angles $\Psi 1$ and $\Psi 2$. In this case, a plane defined by the X' axis and the Z' axis is the vibration plane F. According to such a method, the vibration plane F can be easily specified. The rotation angle $\Psi 1$ can be calculated more accurately as the number of times of the first linear approximation step increases, that is, as a change amount around the Y axis decreases, and the rotation angle $\Psi 2$ can be calculated more accurately as the number of times of the second linear approximation step increases, that is, as a change amount around the X axis decreases, which increases characteristic accuracy of the vibration plane F.

The diagnosis apparatus 3 stores information on the vibration plane F specified as described above. The diagnosis apparatus 3 includes, as the information on the vibration plane F, the rotation angle $\Psi 1$, the rotation angle $\Psi 2$, a plan view shape of the three-dimensional Lissajous figure LF when viewed from the X'-axis direction, a plan view shape of the three-dimensional Lissajous figure LF when viewed from the Z'-axis direction, and a plan view shape of the three-dimensional Lissajous figure LF when viewed from a normal direction of the vibration plane F.

The diagnosis apparatus 3 continuously or periodically performs the physical quantity detection step S1, the Lissajous figure generation step S2, and the vibration plane information acquisition step S3, and accumulates information on at least two vibration planes F.

Diagnosis Step S4

Next, the diagnosis apparatus 3 diagnoses the state of the vacuum pump 90 based on the accumulated information on the vibration plane F. The diagnosis apparatus 3 performs a diagnosis based on a change in an inclination of the vibration plane F, and a diagnosis based on a change in a plan view shape of the three-dimensional Lissajous figure LF.

In the diagnosis based on the change in the inclination of the vibration plane F, the diagnosis apparatus 3 diagnoses the state of the vacuum pump 90 based on a temporal change in the rotation angle $\Psi 1$. Further, the diagnosis apparatus 3 diagnoses the state of the vacuum pump 90 based on a temporal change in the rotation angle $\Psi 2$. However, the diagnosis method based on the change in the inclination of the vibration plane F is not particularly limited.

The diagnosis method based on the temporal change in the rotation angle $\Psi 1$ is not particularly limited, and for example, when the rotation angle $\Psi 1$ steeply changes, it can be diagnosed that an abnormality occurs in the vacuum pump 90. Further, when there is no steep change in the rotation angle $\Psi 1$ but a fluctuation range, that is, a difference between a minimum value and a maximum value of the rotation angle $\Psi 1$ is equal to or larger than a predetermined value due to accumulation of operation time, it may be diagnosed that life of the vacuum pump 90 is expired. According to such a diagnosis method, the state of the vacuum pump 90 can be easily and appropriately diagnosed.

The diagnosis method based on the temporal change in the rotation angle $\Psi 2$ is not particularly limited, and for example, when the rotation angle $\Psi 2$ steeply changes, it can be diagnosed that an abnormality occurs in the vacuum pump 90. Further, when there is no steep change in the rotation angle $\Psi 2$ but a fluctuation range, that is, a difference between a minimum value and a maximum value of the rotation angle $\Psi 2$ is equal to or larger than a predetermined value due to the accumulation of the operation time, it may be diagnosed that the life of the vacuum pump 90 is expired. According to such a diagnosis method, the state of the vacuum pump 90 can be easily and appropriately diagnosed.

In the diagnosis based on the change in the shape of the three-dimensional Lissajous figure LF, the diagnosis apparatus 3 diagnoses the state of the vacuum pump 90 based on a temporal change in the plan view shape of the three-dimensional Lissajous figure LF when viewed from the X'-axis direction. Further, the diagnosis apparatus 3 diagnoses the state of the vacuum pump 90 based on a temporal change in the plan view shape of the three-dimensional Lissajous figure LF when viewed from the Z'-axis direction. Further, the diagnosis apparatus 3 diagnoses the state of the vacuum pump 90 based on a temporal change in a plan view shape of the three-dimensional Lissajous figure LF when viewed from an in-plane direction of the vibration plane F. Further, the diagnosis apparatus 3 diagnoses the state of the vacuum pump 90 based on a temporal change in the plan view shape of the three-dimensional Lissajous figure LF when viewed from the normal direction of the vibration plane F. However, the diagnosis method based on the change in the shape of the three-dimensional Lissajous figure LF is not particularly limited.

The diagnosis method based on the temporal change in the plan view shape of the three-dimensional Lissajous figure LF when viewed from the X'-axis direction is not particularly limited, and for example, when the plan view shape of the three-dimensional Lissajous figure LF steeply changes, it can be diagnosed that an abnormality occurs in the vacuum pump 90. Further, when there is no steep change in the plan view shape but a certain difference or more occurs between a plan view shape at the beginning of a diagnosis and a current plan view shape due to the accumulation of the operation time, it may be diagnosed that the life of the vacuum pump 90 is expired. According to such a diagnosis method, the state of the vacuum pump 90 can be easily and appropriately diagnosed.

The diagnosis method based on the temporal change in the plan view shape of the three-dimensional Lissajous figure LF when viewed from the Z'-axis direction is not particularly limited, and for example, when the plan view shape of the three-dimensional Lissajous figure LF steeply changes, it can be diagnosed that an abnormality occurs in the vacuum pump 90. Further, when there is no steep change in the plan view shape but a certain difference or more occurs between the plan view shape at the beginning of the diagnosis and the current plan view shape due to the accumulation of the operation time, it may be diagnosed that the life of the vacuum pump 90 is expired. According to such a diagnosis method, the state of the vacuum pump 90 can be easily and appropriately diagnosed.

The diagnosis method based on the temporal change in the plan view shape of the three-dimensional Lissajous figure LF when viewed from the in-plane direction of the vibration plane F is not particularly limited, and for example, when the plan view shape of the three-dimensional Lissajous figure LF steeply changes, it can be diagnosed that an abnormality occurs in the vacuum pump 90. Further, when there is no steep change in the plan view shape but a certain difference or more occurs between the plan view shape at the beginning of the diagnosis and the current plan view shape due to the accumulation of the operation time, it may be diagnosed that the life of the vacuum pump 90 is expired. According to such a diagnosis method, the state of the vacuum pump 90 can be easily and appropriately diagnosed.

The diagnosis method based on the temporal change in the plan view shape of the three-dimensional Lissajous figure LF when viewed from the normal direction of the vibration plane F is not particularly limited, and for example, when the plan view shape of the three-dimensional Lissajous figure LF steeply changes, it can be diagnosed that an abnormality occurs in the vacuum pump 90. Further, when there is no steep change in the plan view shape but a certain difference or more occurs between the plan view shape at the beginning of the diagnosis and the current plan view shape due to the accumulation of the operation time, it may be diagnosed that the life of the vacuum pump 90 is expired. According to such a diagnosis method, the state of the vacuum pump 90 can be easily and appropriately diagnosed.

Among these, an example of the temporal changes in the rotation angles $\Psi 1$ and $\Psi 2$ will be described as a representative. FIG. 13 shows the temporal change in the rotation angle $\Psi 1$, and FIG. 14 shows the temporal change in the rotation angle $\Psi 2$. For example, at time point T1 shown in FIGS. 13 and 14, both the rotation angle $\Psi 1$ and the rotation angle $\Psi 2$ steeply change. Therefore, the diagnosis apparatus 3 can diagnose that an abnormality occurs in the vacuum pump 90 at the time point T1.

FIGS. 15 and 16 show the temporal changes in the standard deviations of the rotation angles $\Psi 1$ and $\Psi 2$. FIGS. 15 and 16 show results of the vacuum pumps 90 of the same type, but total operation time in FIG. 16 is longer than that in FIG. 15. As shown in FIGS. 15 and 16, it is understood that as the operation time of the vacuum pump 90 increases, the standard deviations of the rotation angles $\Psi 1$ and $\Psi 2$ increase, and a direction of the vibration plane F becomes unstable. Further, it is understood that a change rate of a standard deviation increases as the total operation time increases. The diagnosis apparatus 3 can diagnose the life and maintenance timing of the vacuum pump 90 based on such information.

Since the diagnosis is made by using the indexes as described above, errors in directions of detection axes of the acceleration sensors 21x, 21y, and 21z generated by deviation of an installation direction of the sensor unit 2 are absorbed by the rotation angles $\Psi 1$ and $\Psi 2$, and the errors do not influence the plan view shape of the three-dimensional Lissajous figure LF (hereinafter, also referred to as a "two-dimensional Lissajous figure"). That is, the two-dimensional Lissajous figure is calculated while eliminating the dependency on the installation direction, and a diagnosis system 1 having excellent diagnosis accuracy is obtained. Further, when the sensor unit 2 is installed in the vacuum pump 90, that is, when the installation direction of the sensor unit 2 does not change, information such as phase information among the digital time-series signals DAx, DAy, and DAz, an amplitude ratio, and a ratio of harmonic components influences the rotation angles $\Psi 1$ and $\Psi 2$, so that various diagnoses can be made based on changes in the rotation angles $\Psi 1$ and $\Psi 2$. Particularly, since the phase information is a dimensionless value, there is an advantage in that the phase information can be applied regardless of characteristics and the installation location of the sensor unit 2.

According to the diagnosis method described above, the vibration of the vacuum pump 90 can be separated into the rotation angles $\Psi 1$ and $\Psi 2$ and the two-dimensional Lissajous figure. Therefore, the diagnosis can be made from different points of view including the transition of the rotation angles $\Psi 1$ and $\Psi 2$ and the image recognition of the two-dimensional Lissajous figure, which enables a more detailed diagnosis of the vacuum pump 90.

The diagnosis system 1 has been described above. As described above, the diagnosis method performed by such a diagnosis system 1 includes: the physical quantity detection step S1 of detecting the physical quantity generated in the diagnosis target 9 by using the acceleration sensors 21x, 21y, and 21z serving as the physical quantity sensors; the Lissajous figure generation step S2 of generating the three-dimensional Lissajous figure LF by plotting the physical quantity detected in the physical quantity detection step S1 in the three-dimensional coordinate system including the first axis, the second axis, and the third axis; the vibration plane information acquisition step S3 of acquiring the information on the vibration plane F of the vibration from the three-dimensional Lissajous figure LF generated in the Lissajous figure generation step S2; and the diagnosis step S4 of diagnosing the state of the diagnosis target 9 based on the information on the vibration plane F acquired in the vibration plane information acquisition step S3. According to such a diagnosis method, it is possible to acquire, as the information on the vibration plane F, information not influenced by the deviation of the detection axes of the acceleration sensors 21x, 21y, and 21z, for example, the two-dimensional Lissajous figure. Therefore, it is possible to prevent a decrease in diagnosis accuracy caused by the deviation of the detection axes of the acceleration sensors 21x, 21y, and 21z.

As described above, in the diagnosis step S4, the state of the diagnosis target 9 is diagnosed based on the shape of the three-dimensional Lissajous figure LF when viewed from the in-plane direction of the vibration plane F, that is, the temporal change in the two-dimensional Lissajous figure. According to such a diagnosis method, the state of the vacuum pump 90 can be easily and appropriately diagnosed.

As described above, in the diagnosis step S4, the state of the diagnosis target 9 is diagnosed based on the shape of the three-dimensional Lissajous figure LF when viewed from the normal direction of the vibration plane F, that is, the temporal change in the two-dimensional Lissajous figure. According to such a diagnosis method, the state of the vacuum pump 90 can be easily and appropriately diagnosed.

As described above, in the diagnosis step S4, the state of the diagnosis target 9 is diagnosed based on the temporal change in the inclination of the vibration plane F. According to such a diagnosis method, the state of the vacuum pump 90 can be easily and appropriately diagnosed.

As described above, in the vibration plane information acquisition step S3, among the plurality of planes whose directions are different from one another, the plane that has the smallest error obtained by linearly approximating the plot points L of the three-dimensional Lissajous figure LF projected onto the plane by using the least-squares method is set as the vibration plane F. According to such a method, the vibration plane F can be easily specified.

As described above, the diagnosis apparatus 3 provided in the diagnosis system 1 performs: the physical quantity detection step S1 of detecting the physical quantity generated in the diagnosis target 9 by using the acceleration sensors 21x, 21y, and 21z serving as the physical quantity sensors; the Lissajous figure generation step S2 of generating the three-dimensional Lissajous figure LF by plotting the physical quantity detected in the physical quantity detection step S1 in the three-dimensional coordinate system including the first axis, the second axis, and the third axis; the vibration plane information acquisition step S3 of acquiring the information on the vibration plane F of the vibration from the three-dimensional Lissajous figure LF generated in the Lissajous figure generation step S2; and the diagnosis step S4 of diagnosing the state of the diagnosis target 9 based on the information on the vibration plane F acquired in the vibration plane information acquisition step S3. According to such a diagnosis apparatus 3, it is possible to acquire, as the information on the vibration plane F, information not influenced by the deviation of the detection axes of the acceleration sensors 21x, 21y, and 21z, for example, the two-dimensional Lissajous figure. Therefore, it is possible to prevent the decrease in the diagnosis accuracy caused by the deviation of the detection axes of the acceleration sensors 21x, 21y, and 21z.

As described above, the diagnosis system 1 includes the acceleration sensors 21x, 21y, and 21z serving as the physical quantity sensors that detect the physical quantity generated in the diagnosis target 9, and the diagnosis apparatus 3 that diagnoses the state of the diagnosis target 9 based on the detection signals of the acceleration sensors 21x, 21y, and 21z. The diagnosis apparatus 3 performs: the physical quantity detection step S1 of detecting the physical quantity generated in the diagnosis target 9 by using the acceleration sensors 21x, 21y, and 21z; the Lissajous figure generation step S2 of generating the three-dimensional Lissajous figure LF by plotting the physical quantity detected in the physical quantity detection step S1 in the three-dimensional coordinate system including the first axis, the second axis, and the third axis; the vibration plane information acquisition step S3 of acquiring the information on the vibration plane F of the vibration from the three-dimensional Lissajous figure LF generated in the Lissajous figure generation step S2; and the diagnosis step S4 of diagnosing the state of the diagnosis target 9 based on the information on the vibration plane F acquired in the vibration plane information acquisition step S3. According to such a diagnosis system 1, it is possible to acquire, as the information on the vibration plane F, information not influenced by the deviation of the detection axes of the acceleration sensors 21x, 21y, and 21z, for example, the two-dimensional Lissajous figure. Therefore, it is possible to prevent the decrease in the diagnosis accuracy caused by the deviation of the detection axes of the acceleration sensors 21x, 21y, and 21z.

Second Embodiment

Figure 17:
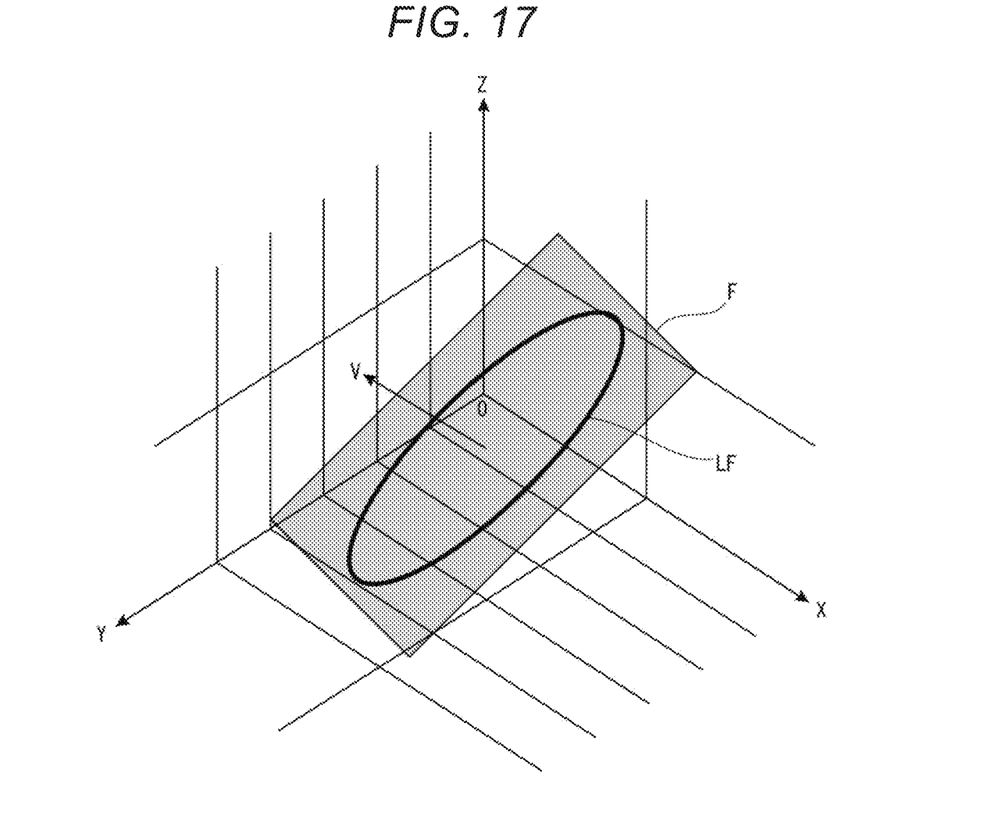
FIG. 17 is a diagram showing a three-dimensional Lissajous figure according to a second embodiment.

FIG. 17 is a diagram showing a three-dimensional Lissajous figure according to a second embodiment.

The diagnosis system 1 according to the present embodiment is similar to the diagnosis system 1 according to the first embodiment described above except that a method for acquiring information on the vibration plane F is different. Therefore, in the following description, the present embodiment will be described focusing on differences from the first embodiment described above, and description of similar matters will be omitted. Further, in the drawings of the present embodiment, configurations similar to those of the embodiment described above will be denoted by the same reference numerals.

In the vibration plane information acquisition step S3, the diagnosis apparatus 3 specifies the vibration plane F as follows, and acquires information on the vibration plane F. In the following description, for convenience of description, it is assumed that the number of the plot points L included in the three-dimensional Lissajous figure LF is n (wherein, n is an integer of 2 or more), and plot points $L_1$, $L_2$, $L_3$, ... and $L_n$ are arranged in a time-series order (in a chronological order).

First, the diagnosis apparatus 3 obtains an angular velocity vector at each plot point L from the plot point $L_1$ to a plot point $L_{n+1}$. In a method for obtaining the angular velocity vector, $\Delta = L_{i+1} - L_i$ is obtained based on coordinates $(x_i, y_i, z_i)$ of an i-th plot point $L_i$ (wherein i is an integer of 1 or more and n−1 or less) and coordinates ($x_{i+1}$, $y_{i+1}$, $z_{i+1}$) of an (i+1)-th plot point $L_{i+1}$, and $L_i \times \Delta$ is calculated, so that an angular velocity vector at the i-th plot point $L_i$ can be obtained. "x" in the calculation formula represents an outer product.

Next, the diagnosis apparatus 3 obtains a sum total of the angular velocity vectors at the plot points L from the plot point $L_1$ to the plot point $L_{n+1}$, and sets the obtained vector as a rotation vector V of the three-dimensional Lissajous figure LF. As shown in FIG. 17, the diagnosis apparatus 3 specifies, as the vibration plane F, a plane orthogonal to the rotation vector V. Further, the diagnosis apparatus 3 specifies the rotation angle Ψ1 of the rotation vector with respect to the X axis around the Y axis, and the rotation angle Ψ2 of the rotation vector with respect to the Z axis around the X axis. According to such a method, the vibration plane F can be easily specified.

In the diagnosis step S4, the diagnosis apparatus 3 diagnoses a state of the vacuum pump 90 based on accumulated information on the vibration plane F. A diagnosis method is similar to that of the first embodiment described above, and performs a diagnosis based on a change in an inclination of the vibration plane F, and a diagnosis based on a change in a plan view shape of the three-dimensional Lissajous figure LF. In the diagnosis based on the change in the inclination of the vibration plane F, the diagnosis apparatus 3 diagnoses the state of the vacuum pump 90 based on temporal changes in the rotation angles Ψ1 and Ψ2. Further, in the diagnosis based on the change in the shape of the three-dimensional Lissajous figure LF, the diagnosis apparatus 3 diagnoses the state of the vacuum pump 90 based on the temporal change in the plan view shape of the three-dimensional Lissajous figure LF when viewed from a direction along the rotation vector. However, the diagnosis method is not particularly limited.

As described above, in the diagnosis method according to the present embodiment, the plane orthogonal to the vector obtained by the sum total of the vectors per unit time at the plot points L of the three-dimensional Lissajous figure LF is set as the vibration plane F. According to such a method, the vibration plane F can be easily specified.

According to the second embodiment as well, effects similar to those of the first embodiment described above can be achieved.

Third Embodiment

Figure 18:
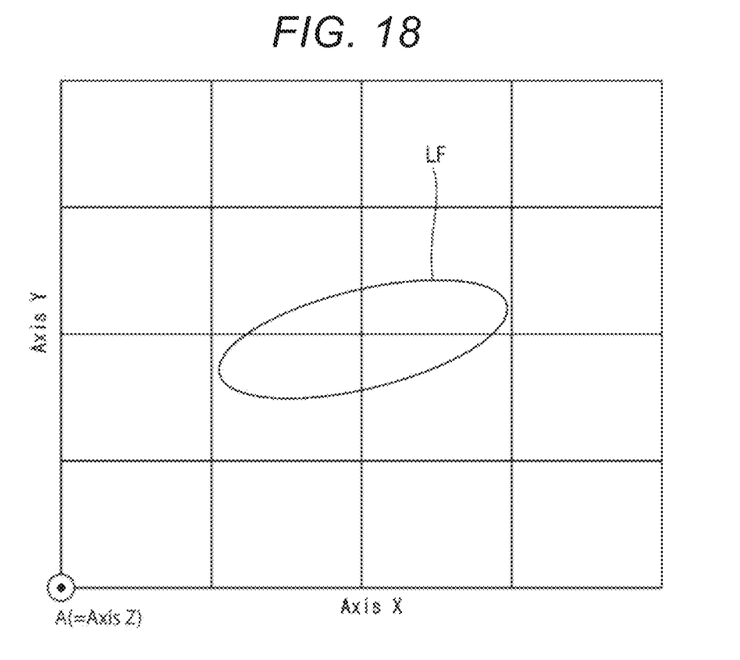
FIG. 18 is a diagram showing a two-dimensional Lissajous figure according to a third embodiment.

FIG. 18 is a diagram showing a two-dimensional Lissajous figure according to a third embodiment.

The diagnosis system 1 according to the present embodiment is similar to the diagnosis system 1 according to the first embodiment described above except that a method for acquiring information on the vibration plane F is different. Therefore, in the following description, the present embodiment will be described focusing on differences from the first embodiment described above, and description of similar matters will be omitted. Further, in the drawings of the present embodiment, configurations similar to those of the embodiment described above will be denoted by the same reference numerals.

In the vibration plane information acquisition step S3, the diagnosis apparatus 3 specifies the vibration plane F as follows, and acquires information on the vibration plane F. In the following description, for convenience of description, it is assumed that the number of the plot points L included in the three-dimensional Lissajous figure LF is set to n (wherein, n is an integer of 2 or more), and plot points $L_1$, $L_2$, $L_3$, . . . and $L_n$ are arranged in a time-series order (in a chronological order).

First, as shown in FIG. 18, the diagnosis apparatus 3 views the three-dimensional Lissajous figure LF from a predetermined direction A in a plan view, and projects the three-dimensional Lissajous figure LF on a plane orthogonal to the predetermined direction A. In FIG. 18, the predetermined direction A is constant with the Z-axis direction. Next, the diagnosis apparatus 3 obtains an area of the three-dimensional Lissajous figure. The area of the three-dimensional Lissajous figure can be obtained, for example, as follows. First, the diagnosis apparatus 3 calculates an area of a triangle that connects the origin of the three-dimensional orthogonal coordinate system, an i-th plot point $L_i$ (wherein i is an integer of 1 or more and n−1 or less), and an (i+1)-th plot point Liu for each i. Next, the diagnosis apparatus 3 sums up the calculated areas of all n−1 triangles, and sets the summed-up area as an area of the three-dimensional Lissajous figure LF (hereinafter, the step is also referred to as an "area calculation step").

The diagnosis apparatus 3 performs the area calculation step a plurality of times while changing the predetermined direction A around the X axis, the Y axis, and the Z axis, and among these, specifies a result including a largest area of the three-dimensional Lissajous figure LF. Next, the diagnosis apparatus 3 specifies, as the vibration plane F, a plane orthogonal to the predetermined direction A of the specified result. Further, the rotation angle Ψ1 of the predetermined direction A with respect to the X axis around the Y axis, and the rotation angle Ψ2 of the predetermined direction A with respect to the Z axis around the X axis are specified. According to such a method, the vibration plane F can be easily specified.

In the diagnosis step S4, the diagnosis apparatus 3 diagnoses a state of the vacuum pump 90 based on accumulated information on the vibration plane F. A diagnosis method is similar to that of the first embodiment described above, and performs a diagnosis based on a change in an inclination of the vibration plane F, and a diagnosis based on a change in a plan view shape of the three-dimensional Lissajous figure LF. In the diagnosis based on the change in the inclination of the vibration plane F, the diagnosis apparatus 3 diagnoses the state of the vacuum pump 90 based on temporal changes in the rotation angles Ψ1 and Ψ2. Further, in the diagnosis based on the change in the shape of the three-dimensional Lissajous figure LF, the diagnosis apparatus 3 diagnoses the state of the vacuum pump 90 based on the temporal change in the plan view shape of the three-dimensional Lissajous figure LF when viewed from a direction along the rotation vector. However, the diagnosis method is not particularly limited.

As described above, in the diagnosis method according to the present embodiment, among the plurality of planes whose directions are different from one another, the plane having the largest area of the three-dimensional Lissajous figure LF projected onto the plane is set as the vibration plane F. According to such a method, the vibration plane F can be easily specified.

According to the third embodiment as well, effects similar to those of the first embodiment described above can be achieved.

The diagnosis method, the diagnosis apparatus, and the diagnosis system of the present disclosure have been described above based on the shown embodiments, but the present disclosure is not limited thereto, and the configurations of the units can be replaced with any configurations having similar functions. Further, any other components may be added to the present disclosure.

What is claimed is:

1. A diagnosis method comprising:
a physical quantity detection step of detecting accelerations along three axes orthogonal to one another by using acceleration sensors, the accelerations being generated due to a vibration of a vacuum pump during operation thereof, the vacuum pump being vibrated around a two-dimensional vibration plane;
a Lissajous figure generation step of generating a three-dimensional Lissajous figure by plotting time-series signals corresponding to the detected accelerations in a three-dimensional coordinate system including a first axis, a second axis, and a third axis as the three axes;
a vibration plane information acquisition step of acquiring information on the two-dimensional vibration plane of the vibration from the three-dimensional Lissajous figure generated in the Lissajous figure generation step; and
a diagnosis step of diagnosing a state of the vacuum pump based on the information of the two-dimensional vibration plane, the information indicating an inclination of the two-dimensional vibration plane with respect to a reference axis.

2. The diagnosis method according to claim 1, wherein in the diagnosis step, the state of the vacuum pump is diagnosed based on a temporal change in a shape of the three-dimensional Lissajous figure when viewed from an in-plane direction of the two-dimensional vibration plane.

3. The diagnosis method according to claim 1, wherein in the diagnosis step, the state of the vacuum pump is diagnosed based on a temporal change in a shape of the three-dimensional Lissajous figure when viewed from a normal direction of the two-dimensional vibration plane.

4. The diagnosis method according to claim 1, wherein in the diagnosis step, the state of the vacuum pump is diagnosed based on a temporal change in an inclination of the two-dimensional vibration plane.

5. The diagnosis method according to claim 1, wherein in the vibration plane information acquisition step, among a plurality of planes whose directions are different from one another, a plane that has a smallest error obtained by linearly approximating plot points of the three-dimensional Lissajous figure projected onto the plane by using a least-squares method is set as the two-dimensional vibration plane.

6. The diagnosis method according to claim 1, wherein among a plurality of planes whose directions are different from one another, a plane having a largest area of the three-dimensional Lissajous figure projected onto the plane is set as the two-dimensional vibration plane.

7. The diagnosis method according to claim 1, wherein a plane orthogonal to a vector obtained by a sum total of vectors per unit time at plot points of the three-dimensional Lissajous figure is set as the two-dimensional vibration plane.

8. A diagnosis apparatus for performing:
a physical quantity detection step of detecting accelerations along three axes orthogonal to one another by using acceleration sensors, the accelerations being generated due to a vibration of a vacuum pump during operation thereof, the vacuum pump being vibrated around a two-dimensional vibration plane;
a Lissajous figure generation step of generating a three-dimensional Lissajous figure by plotting time-series signals corresponding to the detected accelerations in a three-dimensional coordinate system including a first axis, a second axis, and a third axis as the three axes;
a vibration plane information acquisition step of acquiring information on the two-dimensional vibration plane of the vibration from the three-dimensional Lissajous figure generated in the Lissajous figure generation step; and
a diagnosis step of diagnosing a state of the vacuum pump based on the information of the two-dimensional vibration plane, the information indicating an inclination of the two dimensional vibration plane with respect to a reference axis.

9. A diagnosis system comprising:
acceleration sensors configured to detect accelerations along three axes orthogonal to one another, the accelerations being generated due to a vibration of a vacuum pump during operation thereof, the vacuum pump being vibrated around a two-dimensional vibration plane; and
a diagnosis apparatus configured to diagnose a state of the vacuum pump based on a detection signal of the acceleration sensors, wherein
the diagnosis apparatus performs:
a physical quantity detection step of detecting the accelerations generated in the vacuum pump by using the acceleration sensors;
a Lissajous figure generation step of generating a three-dimensional Lissajous figure by plotting time-series signals corresponding to the detected accelerations in a three-dimensional coordinate system including a first axis, a second axis, and a third axis as the three axes;
a vibration plane information acquisition step of acquiring information on the two-dimensional vibration plane of the vibration from the three-dimensional Lissajous figure generated in the Lissajous figure generation step; and
a diagnosis step of diagnosing the state of the vacuum pump based on the information of the two-dimensional vibration plane, the information indicating an inclination of the two-dimensional vibration plane with respect to a reference axis.

* * * * *